United States Patent [19]

Hungenberg et al.

[11] Patent Number: 5,639,822

[45] Date of Patent: Jun. 17, 1997

[54] PROCESS FOR THE PRODUCTION OF HIGH-FLOW PROPYLENE/ETHYLENE COPOLYMERS

[75] Inventors: Klaus-Dieter Hungenberg, Birkenau; Harald Schwager, Speyer; Klaus Dieter Ruempler, Wachenheim; Patrik Mueller, Kaiserslautern, all of Germany

[73] Assignee: BASF Aktiengesellschaft, Ludwigshafen, Germany

[21] Appl. No.: 355,307

[22] Filed: Dec. 12, 1994

Related U.S. Application Data

[60] Continuation of Ser. No. 75,352, Jun. 14, 1993, abandoned, which is a division of Ser. No. 886,914, May 22, 1992, abandoned.

[30] Foreign Application Priority Data

May 25, 1991 [DE] Germany .................. 41 17 144.6

[51] Int. Cl.$^6$ ........................................ C08F 297/08
[52] U.S. Cl. .................... 525/53; 525/247; 525/270; 525/322; 525/323
[58] Field of Search ........................ 525/53, 247, 270, 525/322, 323

[56] References Cited

U.S. PATENT DOCUMENTS

| | | | |
|---|---|---|---|
| 4,454,299 | 6/1984 | Schweier et al. | 525/53 |
| 4,455,405 | 6/1984 | Jaggard et al. | 525/53 |
| 4,857,613 | 8/1989 | Zolk et al. | 526/128 |
| 4,882,380 | 11/1989 | Ficker et al. | 525/53 |

FOREIGN PATENT DOCUMENTS

| | | |
|---|---|---|
| 84/3561 | of 0000 | South Africa . |
| 84/3563 | of 0000 | South Africa . |
| 84/5261 | of 0000 | South Africa . |

*Primary Examiner*—Romulo H. Delmendo
*Attorney, Agent, or Firm*—Keil & Weinkauf

[57] ABSTRACT

High-flow propylene/ethylene copolymers which have a melt flow index of from 2 to 200 g/min under a load of 2.16 kg at 230° C. and which may be produced from the gas phase by polymerization in two stages in an agitated fixed bed in the presence of hydrogen acting as chain stoppage regulator and using a Ziegler-Natta catalyst system comprising a titaniferous solid component which contains a magnesium compound on finely divided silicon oxide or on finely divided aluminum oxide or on a finely divided aluminum silicate having the empirical formula $SiO_2 \cdot aAl_2O_3$, where a stands for a value between 0.001 and 2, and an aluminum component, by means of a procedure comprising a) a first polymerization stage in which propylene is polymerized under a pressure of from 20 to 40 bar and at a temperature of from 60° to 90° C., the ratio of the partial pressure of the hydrogen to that of the propylene being adjusted to from 1:100 to 10:100, followed by b) a second polymerization stage, which consists in the polymerization, at a temperature of from 40° to 100° C., of a mixture of propylene and ethylene and the addition thereof, in the form of polymerized units, to the polypropylene produced in the first polymerization stage, the pressure in this second polymerization stage being from 10 to 30 bar and at least 7 bar lower than that used in the first polymerization stage, while the ratio of the partial pressure of the hydrogen to that of the propylene is adjusted to from 2:100 to 12:100 and the ratio of the weight of monomer converted in the first stage to that of monomer converted in the second stage is kept within the range of 1:1 to 20:1.

6 Claims, No Drawings

PROCESS FOR THE PRODUCTION OF HIGH-FLOW PROPYLENE/ETHYLENE COPOLYMERS

This application is a continuation of application Ser. No. 08/075,352, filed on Jun. 14, 1993, now abandoned, which is a divisional of Ser. No. 07/886,914, filed on May 22, 1992, now abandoned.

The present invention relates to high-flow propylene/ethylene copolymers which have a melt flow index of from 2 to 200 g/10 min under a load of 2.16 kg at 230° C. and which may be produced from the gas phase by polymerization in two stages in an agitated fixed bed in the presence of hydrogen acting as chain stoppage regulator and using a Ziegler-Natta catalyst system comprising a titaniferous solid component which contains a magnesium compound on finely divided silicon oxide or on finely divided aluminum oxide or on a finely divided aluminum silicate having the empirical formula $SiO_2.aAl_2O_3$, where a stands for a value between 0.001 and 2, and an aluminum component, by means of a procedure comprising a) a first polymerization stage in which propylene is polymerized under a pressure of from 20 to 40 bar and at a temperature of from 60° to 90° C., the ratio of the partial pressure of the hydrogen to that of the propylene being adjusted to from 1:100 to 10:100, followed by b) a second polymerization stage, which consists in the polymerization, at a temperature of from 40° to 100° C., of a mixture of propylene and ethylene and the addition thereof, in the form of polymerized units, to the polypropylene produced in the first polymerization stage, the pressure in this second polymerization stage being from 10 to 30 bar and at least 7 bar lower than that used in the first polymerization stage, while the ratio of the partial pressure of the hydrogen to that of the propylene is adjusted to from 2:100 to 12:100 and the ratio of the weight of monomer converted in the first stage to that of monomer converted in the second stage is kept within the range of 1:1 to 20:1.

The invention further relates to a process for the preparation of said copolymers and to film and molded articles made therefrom.

The literature contains a number of references to the polymerization of propylene by Ziegler-Natta processes. The catalyst components used include inter alia compounds of polyvalent titanium, aluminum halides and/or alkyls, and electron donating compounds, usually silanes, esters, ethers, ketones, or lactones (EP-B 14,523, EP-B 45,977, EP-B 86,473, EP-A 171,200, U.S. Pat. No. 4,857,613).

Processes for the preparation of propylene/ethylene copolymers using a Ziegler-Natta catalyst system have also been described (U.S. Pat. No. 4,454,299, U.S. Pat. No. 4,455,405, ZA-A 0084/3561, ZA-A 0084/3563) in which gaseous propylene is first polymerized in a first reaction zone and the resulting homopolymer is then passed to a second reaction zone where a mixture of ethylene and propylene is polymerized and added to said homopolymer in the form of polymerized units. The process is generally carried out at an elevated pressure and in the presence of hydrogen acting as chain stoppage regulator. One important condition which must be fulfilled when carrying out this method, if it is to produce propylene/ethylene copolymers showing good physical properties for industrial applications, is the use of relatively high amounts of hydrogen in the second reactor; which in turn increases the process engineering requirements. This particular form of the polymerization process yields copolymers which are characterized by very good fabrication properties.

ZA-A 0084/5261 also describes a process for the preparation of propylene/ethylene copolymers using a Ziegler-Natta catalyst system, in which gaseous propylene is first polymerized in a first reaction zone and the resulting propylene homopolymer is then passed to a second reaction zone where a mixture of ethylene and propylene is polymerized and added to said homopolymer in the form of polymerized units. The special characteristics of this process are the use of a specific Ziegler-Natta catalyst system and, again, the necessity to use a very large amount of hydrogen as chain stoppage regulator in the second polymerization stage, in order to produce polymers exhibiting high flow properties. Here again, high hydrogen concentrations lead to a reduction in productivity and to an increase in the engineering requirements.

In order to avoid such drawbacks, high-flow propylene polymers, which are characterized by the ease with which they can be fabricated, are usually produced by subjecting the propylene polymers to thermal or peroxidic reduction of their molar mass immediately after they have been formed. This manufacturing method is very costly, and the use of peroxides adds a hazard factor.

It is thus an object of the invention to overcome the aforementioned disadvantages by providing high-flow polymers of propylene which have good properties for industrial applications and which can be produced by a method which is not subject to enhanced process engineering requirements.

Accordingly, we have found the novel propylene/ethylene copolymers defined above.

The propylene/ethylene copolymers of the invention have melt flow indices of from 2 to 200 g/10 min and preferably from 5 to 150 g/10 min under a load of 2.16 kg at a temperature of 23° C. The melt flow index is taken to be the amount of polymer which is discharged from a test apparatus complying to DIN 53,735 when the polymer is subjected to a load of 2.16 kg over a period of 10 minutes at 230° C.

The process for the production of said polymers can be carried out batchwise or, preferably, continuously, in reactors normally used for the polymerization of propylene. Suitable reactors are, for example, continuous stirred vessels, usually arranged in a cascade of several stirred vessels. The reactors contain a fixed bed of finely divided polymer which is usually agitated by stirring.

The propylene/ethylene copolymers of the invention are prepared from the gas phase by polymerization in two stages in the presence of hydrogen acting as chain stoppage regulator and using a special Ziegler-Natta catalyst system comprising a titaniferous solid component containing a magnesium compound on finely divided silicon oxide or on finely divided aluminum oxide or on a finely divided aluminum silicate having the empirical formula $SiO_2.aAl_2O_3$, where a stands for a value between 0.001 and 2, and an aluminum component.

The titanium compounds used for preparation of the titaniferous solid component are generally halides or alcoholates of trivalent or tetravalent titanium, preference being given to the chlorides of titanium, especially titanium tetrachloride.

The finely divided substrate used in the invention is preferably silicon oxide or an aluminum silicate of the empirical formula $SiO_2.aAl_2O_3$, where a stands for a value between 0.01 and 0.5.

Particularly preferred substrates have a particle diameter of from 0.1 to 1,000 μm, especially from 10 to 300 μm, a pore volume of from 0.1 to 10 cm³/g, especially from 1.0 to 5.0 cm³/g, and a specific surface area of from 10 to 1,000 m²/g, especially from 100 to 500 m²/g.

The titaniferous solid component used in the process of the invention also incorporates, inter alia, compounds of magnesium. Examples of suitable magnesium compounds for use in the manufacture of said component are, in particular, magnesium halides, magnesium alkyls, and magnesium aryls, also magnesium alkoxy compounds and magnesium aryloxy compounds, and the preferred compounds are magnesium dichloride, magnesium dibromide, and magnesium di($C_1$–$C_{10}$-alkyl) compounds. The titaniferous solid component may also contain halogen, preferably chlorine or bromine.

The titaniferous solid component usually also contains electron donating compounds, for example monofunctional or polyfunctional carboxylic acids, carboxylic anhydrides, and carboxylic esters, or ketones, ethers, alcohols, lactones, and phosphorus-organic and silicon-organic compounds. Preferred electron donors in the titaniferous solid component are phthalic derivatives of the general formula I

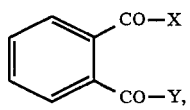 (I)

in which X and Y individually denote chlorine or a $C_1$–$C_{10}$-alkoxy radical or are both oxygen. Particularly preferred electron donating compounds are phthalates in which X and Y each denote a $C_1$–$C_8$-alkoxy radical, for example methoxy, ethoxy, propyloxy, or butyloxy.

Other preferred electron donating compounds in the titaniferous solid component are, for example, diesters of 3-membered or 4-membered, optionally substituted cycloalkyl-1,2-dioic acids, and monoesters of optionally substituted benzophenone-2-carboxylic acids. The hydroxy compounds used for the synthesis of such esters are the alcohols normally employed in esterifications, for example $C_1$–$C_{15}$-alkanols, $C_5$–$C_7$-alkanols, which may in turn carry $C_1$–$C_{10}$-alkyl groups, and also phenols, naphthols, and their $C_1$–$C_{10}$-alkyl derivatives.

The titaniferous solid component can be manufactured by known methods, examples of which are described in EP-A 45,975, EP-A 45,977, EP-A 86,473, EP-A 171,200, GB-A 2,111,066, and U.S. Pat. No. 4,857,613.

The following three-stage procedure is preferably used for the manufacture of the titaniferous solid component.

In the first stage, a finely divided substrate, preferably silicon dioxide or $SiO_2 \cdot aAl_2O_3$ (where a stands for a value from 0.001 to 2, preferably from 0.01 to 0.5), is mixed with a solution of the compound containing magnesium in a liquid alkane, and the resulting mixture is stirred for from 0.5 to 5 hours at a temperature of from 10° to 120° C. The amount of magnesium compound used is preferably from 0.1 to 1 mole per mole of substrate. With continuous stirring, a halogen or halohydrocarbon, preferably chlorine or hydrogen chloride, is then added in a molar excess of from two to five times the molar amount of magnesium compound. Following an interim period of from about 30 to 120 minutes, the solid is removed from the liquid phase.

In the second stage, the product obtained in the first stage is added to a liquid alkane, and to this mixture there is then added a $C_1$–$C_8$-alkanol, preferably ethanol, a halide or alcoholate of trivalent or tetravalent titanium, preferably titanium tetrachloride, and an electron donating compound, preferably a phthalic derivative of the general formula I. For each mole of magnesium in the solid material produced in the first stage, there are added from 1 to 5 moles, preferably from 2 to 4 moles, of alkanol, from 2 to 20 moles, preferably 4 to 10 moles, of trivalent or tetravalent titanium, and from 0.01 to 1 mole, preferably from 0.1 to 1.0 mole, of electron donating compound. This mixture is then stirred for at least one hour at a temperature of from 10° to 150° C., after which the resulting solids are isolated by filtration and washed with a liquid alkane, preferably hexane or heptane.

In the third stage, the solids obtained in the second stage are extracted for several hours at a temperature of from 100° to 150° C. with excess titanium tetrachloride or a solution, present in excess, of titanium tetrachloride in an inert solvent, preferably an alkylbenzene, the concentration of titanium tetrachloride in this solution being at least 5% w/w. The product is then washed with a liquid alkane until the content of titanium tetrachloride in the washings falls below 2% w/w.

The titaniferous solid component thus obtained is used in combination with an aluminum component to form the Ziegler-Natta catalyst system.

Suitable aluminum compounds are trialkylaluminum and compounds of this type in which one of the alkyl groups is replaced by an alkoxy group or by a halogen atom such as a chlorine or bromine atom. We prefer to use trialkylaluminum compounds in which the alkyl groups contain from 1 to 8 carbon atoms, eg trimethylaluminum, triethylaluminum, and methyldiethylaluminum.

We prefer to use an electron donating compound as a further catalyst component in addition to the above aluminum compound, examples of which are monofunctional or polyfunctional carboxylic acids, carboxylic anhydrides, carboxylates, ketones, ethers, alcohols, lactones, phosphorus-organic compounds, and silicon-organic compounds. Particularly suitable electron donors are silicon-organic compounds of the general formula II

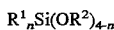 (II)

in which $R^1$ denotes one or various radicals selected from the following: $C_1$–$C_{20}$-alkyl groups, 5-membered to 7-membered cycloalkyl groups, which may be substituted by a $C_1$–$C_{10}$-alkyl group, $C_6$–$C_{20}$-aryl groups, $C_7$–$C_{20}$-arylalkyl groups; $R^2$ denotes one or various $C_1$–$C_{20}$-alkyl groups; and n is equal to 1, 2, or 3. Those compounds are particularly preferred in which $R^1$ is a $C_1$–$C_8$-alkyl group or a 5-membered to 7-membered cycloalkyl group, $R^2$ is a $C_1$–$C_4$-alkyl group and n is equal to 1 or 2.

Of these compounds, the following are particularly noteworthy: dimethoxydiisopropylsilane, dimethoxyisobutylisopropylsilane, dimethoxydiisobutylsilane, dimethoxydicyclopentylsilane, and diethoxyisobutylisopropylsilane.

Use is preferably made of catalyst systems in which the atomic ratio of the aluminum in the aluminum compound to the titanium in the titaniferous solid component is from 10:1 to 800:1, more preferably from 20:1 to 200:1, and the molar ratio of the aluminum compound to the electron donor used as supplementary catalyst component is from 1:1 to 100:1, more preferably from 2:1 to 80:1. The catalyst components may be fed to the polymerization system either individually, in any order, or as a mixture of components.

The pressure and temperature conditions used for the polymerization carried out in the first polymerization stage are from 20 to 40 bar and from 60° to 90° C. and preferably from 25 to 35 bar and from 65° to 85° C. The reaction conditions are usually adjusted so as to yield from 0.05 to 2 kg, preferably from 0.1 to 1.5 kg, of propylene polymer in the first polymerization stage per mmole of aluminum component. In this first polymerization stage, the average residence time of the reaction mixture is usually from 1 to 5 hours and preferably from 1.5 to 4 hours. The ratio of the partial pressure of the hydrogen used as chain stoppage regulator to that of the propylene is adjusted to from 1:100 to 10:100 and preferably from 2:100 to 8:100.

On completion of the reaction, the polypropylene formed in the first polymerization stage is withdrawn from the first polymerization stage together with the catalyst and fed to the second polymerization stage, where a mixture of ethylene and propylene is added thereto by addition polymerization. The comonomers are preferably used in such quantities as to give a ratio of the partial pressure of the propylene to that of the ethylene of from 0.2:1 to 10:1, more preferably from 0.5:1 to 5:1. The mixture of comonomers may also contain small amounts of $C_4$–$C_8$-alk-1-enes such as but-1-ene, pent-1-ene, hex-1-ene, hept-1-ene, or oct-1-ene. The concentration of such $C_4$–$C_8$-alk-1-enes should be restricted so as to give a ratio of the partial pressure of said $C_4$–$C_8$-alk-1-enes to that of the ethylene within the range 1:100 to 10:100. The pressure employed in the second polymerization stage is at least 7 bar, preferably at least 10 bar, below that used in the first polymerization stage and has a value of from 10 to 30 bar, preferably from 10 to 25 bar. A temperature of from 40° to 100° C., preferably from 60° to 90° C., is used in the second polymerization stage, in which the residence time of the reaction mixture is usually from 1 to 5 hours, preferably from 1.5 to 4 hours.

According to the invention, the ratio of the partial pressure of the hydrogen used as chain stoppage regulator in the second polymerization stage to the propylene is kept within the range 2:100 to 12:100, preferably 2.5:100 to 10:100. It is also necessary to keep the ratio of the weight of monomer converted in the first polymerization stage to that of monomer converted in the second stage within the range 1:1 to 20:1, preferably 1.5:1 to 15:1.

It may be recommendable to add a $C_1$–$C_8$-alkanol, preferably a $C_1$–$C_4$-alkanol, to the reaction mixture in the second polymerization stage to influence the activity of the Ziegler-Natta catalyst. Suitable alkanols for this purpose are, inter alia, methanol, ethanol, n-propanol, n-butanol, and especially isopropanol. The amount of $C_1$–$C_8$-alkanol used is advantageously such as to give a molar ratio of $C_1$–$C_8$-alkanol to the aluminum component of from 0.01:1 to 10:1, preferably from 0.02:1 to 5:1.

The propylene/ethylene copolymers produced by the process described above can be readily obtained without increasing the process engineering requirements and show better flow, a broader molecular weight distribution, and better fabrication properties than the prior art propylene/ethylene copolymers. They are particularly well suited for the manufacture of films and molded articles.

EXAMPLES

In all of the following Example 1 to 4, the process was carried out in two in-line stirred autoclaves having a capacity of 180 l. Both reactors contained an agitated fixed bed of finely divided polypropylene.

Gaseous propylene was fed to the first polymerization reactor and remained therein for an average residence time of 2.0 hours to be polymerized with the aid of the Ziegler-Natta catalyst proposed by the invention. The actual experimental conditions, the ratio of the partial pressure of the hydrogen used as chain stoppage regulator to that of the propylene, the ratio of the weight of monomer converted in the first polymerization stage to that converted in the second polymerization stage, and the melt flow indices of the resulting polymers are listed in Table 1 below for all Examples.

In all of the Examples, polymerization was carried out continuously using a Ziegler-Natta catalyst for which 1 g/h of a titaniferous solid component, 60 mmoles/h of triethylaluminum, and 6 mmoles/h of dimethoxyisobutylisopropyl-silane were used as catalyst components. The amount of propylene copolymer produced in the first polymerization zone was 0.4 kg per mmole of the aluminum compound.

The propylene polymer formed in the first reactor was then passed, together with the catalyst, to the second stirred autoclave, where a mixture of propylene and ethylene was polymerized and added to said polymer in the form of polymerized units, over a residence time of 2.0 hours. The actual experimental conditions, the ratios of the partial pressure of the ethylene to that of the propylene and of the partial pressure of the hydrogen to that of the propylene, the melt flow indices and the molecular weight distributions Q of the resulting copolymers are listed in Table 2 below for all Examples.

The titaniferous solid component was prepared by the following method.

In a first stage, butyloctylmagnesium dissolved in n-heptane was added to $SiO_2$ having a particle diameter of from 20 to 45 μm, a pore volume of 1.75 $cm^3/g$ and a surface area of 320 $m^2/g$, the amount of magnesium compound used being 0.3 mole per mole of $SiO_2$. The solution was stirred for 1.5 hours at 90° C. and then cooled to 20° C. Hydrogen chloride was then bubbled in until the molar amount fed was ten times that of the magnesium compound. After 30 minutes, the solid product was separated from the solvent.

n-Heptane was added to the product obtained in the first stage, after which 3 moles of ethanol were added with constant stirring, per mole of magnesium. This mixture was stirred for 1.5 hours at 80° C., following which 6 moles of titanium tetrachloride and 0.5 mole Of di-n-butyl phthalate were added, per mole of magnesium. The reaction mixture was stirred for a further two hours, after which the solids were separated from the solvent by filtration.

The resulting product was extracted for two hours at 125° C. with a 15% w/w solution of titanium tetrachloride in ethylbenzene. The solids were then separated from the extracting agent by filtration and washed with n-heptane until the washings contained not more than 0.3% w/w of titanium tetrachloride.

The titaniferous solid component thus obtained contained 3.1% w/w of titanium, 7.5% w/w of magnesium, and 28.3% w/w of chlorine. The properties of the propylene/ethylene copolymers obtained in Examples 1 to 4 are listed in Table 3 below.

COMPARATIVE EXAMPLE A

Using a method similar to that used in Examples 1 to 4, propylene was polymerized in a first polymerization stage and the resulting polypropylene was passed to a second polymerization stage, where a mixture of propylene and ethylene was polymerized and added to said polypropylene in the form of polymerized units. This Example diverged from Examples 1 to 4 in that the ratio of the partial pressure of the hydrogen to that of the propylene was 0.5:100 in the first polymerization stage and 1.45:100 in the second polymerization stage.

The resulting propylene/ethylene copolymer exhibits a comparatively low melt flow index (2 g/10 min at 230° C. under a load of 2.16 kg as determined by DIN 53,735). In order to improve the flow of the copolymer, it was then subjected to a peroxidic reduction of molar mass using 2,5-dimethyl-2,5-di (t-butylperoxy)hexane in a Werner & Pfleiderer twin extruder at a temperature of from 220° to 230° C. and under a pressure of 16 bar, the residence time being approximately 4 minutes.

The properties of the propylene/ethylene copolymer thus obtained and the reaction conditions used for the preparation thereof are listed in Tables 1 to 3 below.

COMPARATIVE EXAMPLE B

Using a method similar to that used in Examples 1 to 4, propylene was polymerized in a first polymerization stage and the resulting polypropylene was passed to a second polymerization stage, where a mixture of propylene and ethylene was polymerized and added to said polypropylene in the form of polymerized units. This Example diverged from Examples 1 to 4 in that the ratio of the partial pressure of the hydrogen to that of the propylene was 40:100 in the second polymerization stage.

The properties of the propylene/ethylene copolymer thus obtained and the reaction conditions used for the preparation thereof are listed in Tables 1 to 3 below.

TABLE 3

Properties of the Resulting Propylene/Ethylene Copolymers

| Example | Rigidity* (G-module) [N/mm$^2$] | Notched Impact Strength** [kJ/m$^2$] | Residues in Polymer Chlorine [ppm] | Titanium [ppm] |
|---|---|---|---|---|
| 1 | 625 | 2.6 | <12 | <2 |
| 2 | 520 | 6.2 | <10 | <2 |
| 3 | 545 | 4.1 | <10 | <2 |
| 4 | 375 | 100% crack | <10 | <2 |
| A | 520 | 6.6 | <13 | <2 |
| following peroxidic reduction of molar mass: | | | | |
| A' | 500 | 5.1 | <13 | <2 |
| B | 610 | <1.0 | <13 | <2 |

*as specified in DIN 53,445
**as specified in DIN 53,453, at −20° C.

The comparison of Example 2 with Comparative Example A' shows that the propylene/ethylene copolymer of the invention exhibits better rigidity and higher notched impact resistance at equal flow characteristics, ie equal melt flow indices. Furthermore, the propylene/ethylene copolymer of Example 1 shows better rigidity and higher notched impact resistance than that of Comparative Example B.

TABLE 1

Reaction Conditions in the First Polymerization Stage

| Ex. | Temp. [°C.] | Pressure [bar] | Ratio of partial pressures hydrogen:propylene | Melt flow index* [g/10 min] | Ratio w/w monomer converted in 1st stage to monomer converted in 2nd stage |
|---|---|---|---|---|---|
| 1 | 80 | 32 | 1.8:100 | 26 | 7.7:1 |
| 2 | 80 | 32 | 2.0:100 | 33 | 4.5:1 |
| 3 | 80 | 32 | 4.8:100 | 110 | 4.5:1 |
| 4 | 80 | 32 | 2.0:100 | 33 | 1.8:1 |
| A | 80 | 32 | 0.5:100 | 5 | 4.5:1 |
| B | 80 | 32 | 1.8:100 | 26 | 7.7:1 |

*melt flow index of the polymer obtained, determined at 230° C. under a load of 2.16 kg, as specified in DIN 53,735

TABLE 2

Reaction Conditions in the Second Polymerization Stage

| Ex. | Temp. [°C.] | Pressure [bar] | Ratio of partial pressures hydrogen: propylene | propylene: ethylene | Melt flow index* [g/10 min] | Molar mass ratio Q [$\bar{M}_w/\bar{M}_n$] |
|---|---|---|---|---|---|---|
| 1 | 70 | 15 | 8.0:100 | 1.7:1 | 16 | 4–5 |
| 2 | 70 | 15 | 4.1:100 | 2.3:1 | 16 | 4–5 |
| 3 | 70 | 15 | 7.4:100 | 2.3:1 | 48 | 4–5 |
| 4 | 70 | 20 | 6.6:100 | 2.3:1 | 8 | 4–5 |
| A | 70 | 15 | 1.45:100 | 2.3:1 | 2 | 4–5 |
| B | 70 | 15 | 40:100 | 1.7:1 | 49 | 5–6 |
| following the peroxidic reduction of molar mass of the copolymer obtained in A: | | | | | | |
| A' | | | | | 16 | 3 |

*melt flow index of the copolymer obtained, determined at 230° C. under a load of 2.16 kg, as specified in DIN 53,735

We claim:

1. A process for the preparation of a propylene/ethylene copolymer which comprises:

polymerizing propylene, in a first polymerization stage, in the gas phase in an agitated fixed bed in the presence of hydrogen acting as a chain stoppage regulator in the presence of a Ziegler-Natta catalyst system comprising a titaniferous solid component containing a magnesium compound and a titanium compound on finely divided silicon oxide or on finely divided aluminum oxide or on a finely divided aluminum silicate having the empirical formula $SiO_2.aAl_2O_3$, where a stands for a value between 0.001 and 2, and a trialkyl-, dialkyl(alk)oxy-, dialkylhalogen aluminum compound, and an electron donating compound the pressure in the first polymerization stage being from 20 to 40 bar and the temperature from 60° to 90° C., the ratio of the partial pressure of the hydrogen to that of the propylene being 1:100 to 10:100, passing the polypropylene from the first stage to the second of two polymerization stages in seriatim, wherein a mixture of propylene and ethylene is polymerized onto the polypropylene from the first polymerization stage, the pressure in said second polymerization stage being from 10 to 30 bar and at least 7 bar below the pressure used in the first polymerization stage, the ratio of the weight of monomer converted in the first polymerization stage to that converted in the second polymerization stage being 1:1 to 20:1, the ratio of the partial pressure of the hydrogen to that of the propylene in the second polymerization stage being from 2:100 to 12:100, wherein, the titaniferous solid component is made by: (a) mixing finely divided silicon dioxide, finely divided aluminum oxide, or finely divided aluminum silicate having the empirical formula $SiO_2.aAl_2O_3$, where a is a value between 0.001 and 2, with a solution of a magnesium compound in a liquid alkane; (b) stirring the mixture of (a) for 0.5 to 5 hours at a temperature of from 10° to 120° C.; (c) adding a halogen or a halohydrocarbon in a molar excess of from 2 to 5 times the molar amount of the magnesium compound under continuous stirring conditions; (d) separating the solids of (c); (e) combining the separated solids of (d) with a liquid alkane; (f) adding 1 to 5 moles (per mole of the magnesium compound) of a $C_1$–$C_8$-alkanol, 2 to 20 moles (per mole of the magnesium compound) of a halide or alcoholate of trivalent or tetravalent titanium, and 0.01 to 1 mole of an electron donating compound to the resulting mixture; (g) stirring for at least one hour at 10° to 150° C. (h) isolating the solids of (g) by filtration; (i) washing the solids of (h) with a liquid alkane; (j) extracting the solids of (i) for several hours with excess titanium tetrachloride, or a 5 wt % or greater solution thereof in an inert solvent, at 100° to 150° C.; and then (k) washing the solids of (j) with a liquid alkane until the content of titanium tetrachloride in the washings fall below 2 wt %.

2. A process as claimed in claim 1, wherein the ratio of the partial pressure of the hydrogen to that of the propylene in the first polymerization stage is from 2:100 to 8:100.

3. A process as claimed in claim 1, wherein the ratio of the partial pressure of the hydrogen to that of the propylene in the second polymerization stage is from 2.5:100 to 10:100.

4. A process as claimed in claim 1, wherein the ratio of the weight of monomer converted in the first polymerization stage to the weight of monomer converted in the second polymerization stage is from 1.5:1 to 15:1.

5. A process as claimed in claim 1, wherein the catalyst system further contains a phthalic acid derivative of the formula

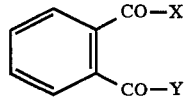

in which X and Y denote chlorine, $C_1$- to $C_{10}$-alkoxy, or together denote oxygen.

6. A process as defined in claim 1, wherein the catalyst system additionally contains a silicon organic compound of the formula

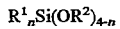

in which $R^1$ denotes one or more radicals selected from the group consisting of $C_1$- to $C_{20}$-alkyl, 5-membered to 7-membered cycloalkyl, which may be substituted by a $C_1$- to $C_{10}$-alkyl, $C_6$- to $C_{20}$-aryl and $C_7$- to $C_{20}$-arylalkyl groups; $R^2$ denotes $C_1$- to $C_2$-alkyl; and n is 1 or 2.

* * * * *